United States Patent
Kawabe

(10) Patent No.: US 12,175,019 B2
(45) Date of Patent: Dec. 24, 2024

(54) PSEUDO HAPTIC SENSE CONTROL APPARATUS, PSEUDO HAPTIC SENSE CONTROL METHOD, AND PROGRAM

(71) Applicant: NIPPON TELEGRAPH AND TELEPHONE CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 169 days.

(21) Appl. No.: 17/916,462

(22) PCT Filed: Apr. 2, 2020

(86) PCT No.: PCT/JP2020/015219
§ 371 (c)(1),
(2) Date: Sep. 30, 2022

(87) PCT Pub. No.: WO2021/199408
PCT Pub. Date: Oct. 7, 2021

(65) Prior Publication Data
US 2023/0146335 A1 May 11, 2023

(51) Int. Cl.
*G06F 3/01* (2006.01)
*G06F 3/04845* (2022.01)

(52) U.S. Cl.
CPC .......... *G06F 3/017* (2013.01); *G06F 3/04845* (2013.01)

(58) Field of Classification Search
CPC ...... G06F 3/017; G06F 3/016; G06F 3/04815; G06F 3/04845; G06F 3/04883
See application file for complete search history.

(56) References Cited

U.S. PATENT DOCUMENTS

2011/0050404 A1* 3/2011 Nakamura .............. G06F 3/011
340/407.1
2014/0320431 A1* 10/2014 Cruz-Hernandez ..... G06F 3/016
345/173
(Continued)

FOREIGN PATENT DOCUMENTS

WO 2017104272 A1 6/2017

OTHER PUBLICATIONS

Lecuyer et al. (2000) "Pseudo-Haptic Feedback : Can Isometric Input Devices Simulate Force Feedback?" Proc. IEEE Virtual Real. Mar. 2000.
(Continued)

*Primary Examiner* — Muhammad N Edun

(57) ABSTRACT

A pseudo haptic sensation is perceived by visually presenting a situation in which an object is deformed in accordance with a pulling action or a pushing action by at least one body part. Note that a rate of a magnitude of deformation of the object to a pulling amount of the pulling action or a pushing amount of the pushing action when providing a pseudo haptic sensation of a material having a first stiffness is higher than a rate of the magnitude of deformation of the object to a pulling amount of the pulling action or a pushing amount of the pushing action when providing a pseudo haptic sensation of a material having a second stiffness which is stiffer than the first stiffness.

14 Claims, 8 Drawing Sheets

(56) References Cited

U.S. PATENT DOCUMENTS

2018/0059787 A1\* 3/2018 Keller .................. G06F 3/011
2018/0299963 A1 10/2018 Fukazawa et al.

OTHER PUBLICATIONS

Argelaguet et al. (2013) "Elastic images: Perceiving local elasticity of images through a novel pseudo-haptic deformation effect" ACM Transactions on Applied Perception, vol. 10, No. 3.

Ban et al. (2014) "Modifying Perceived Stiffness of Pinched objects Using Hand Deformational Visual Feedback" Transactions of the Virtual Reality Society of Japan, vol. 19, No. 4, pp. 523-532.

Hirano et al. (2011) "Dent-Softness Illusion: Psychophysical Influence on Sense of Hardness by Mixed-Reality Visual Stimulation" Transactions of the Virtual Reality Society of Japan, vol. 16, No. 2, pp. 271-278.

Takahiro Kawabe (2020) "Mid-Air Action Contributes to Pseudo-Haptic Stiffness Effects" IEEE Transactions On Haptics, vol. 13, No. 1 [online] website: https://ieeexplore.ieee.org/stamp/stamp.jsp?tp=&arnumber=8941284.

\* cited by examiner

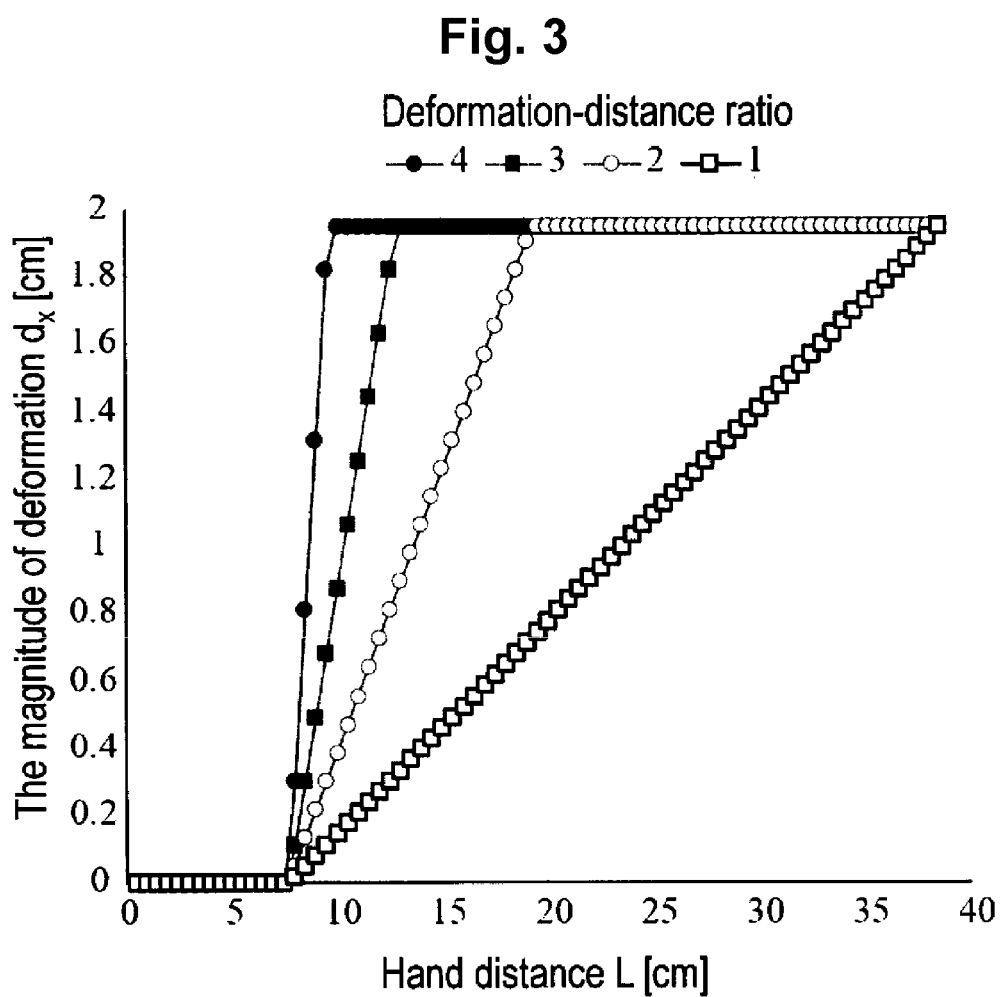

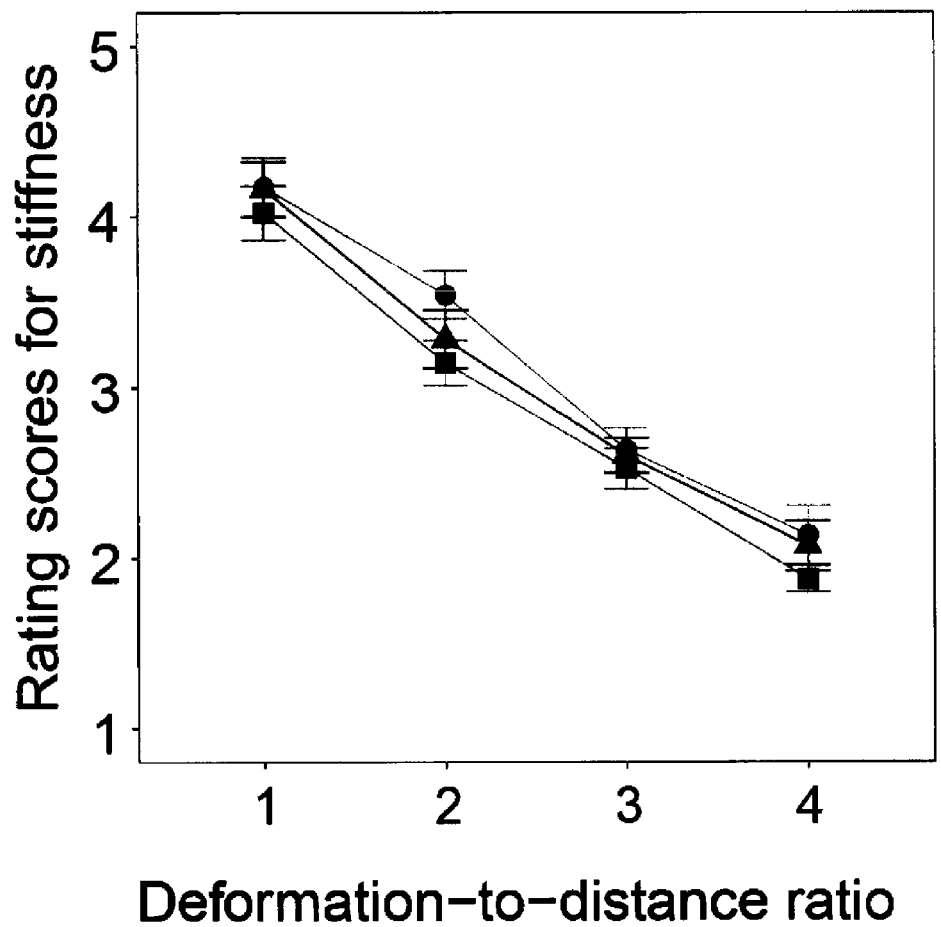

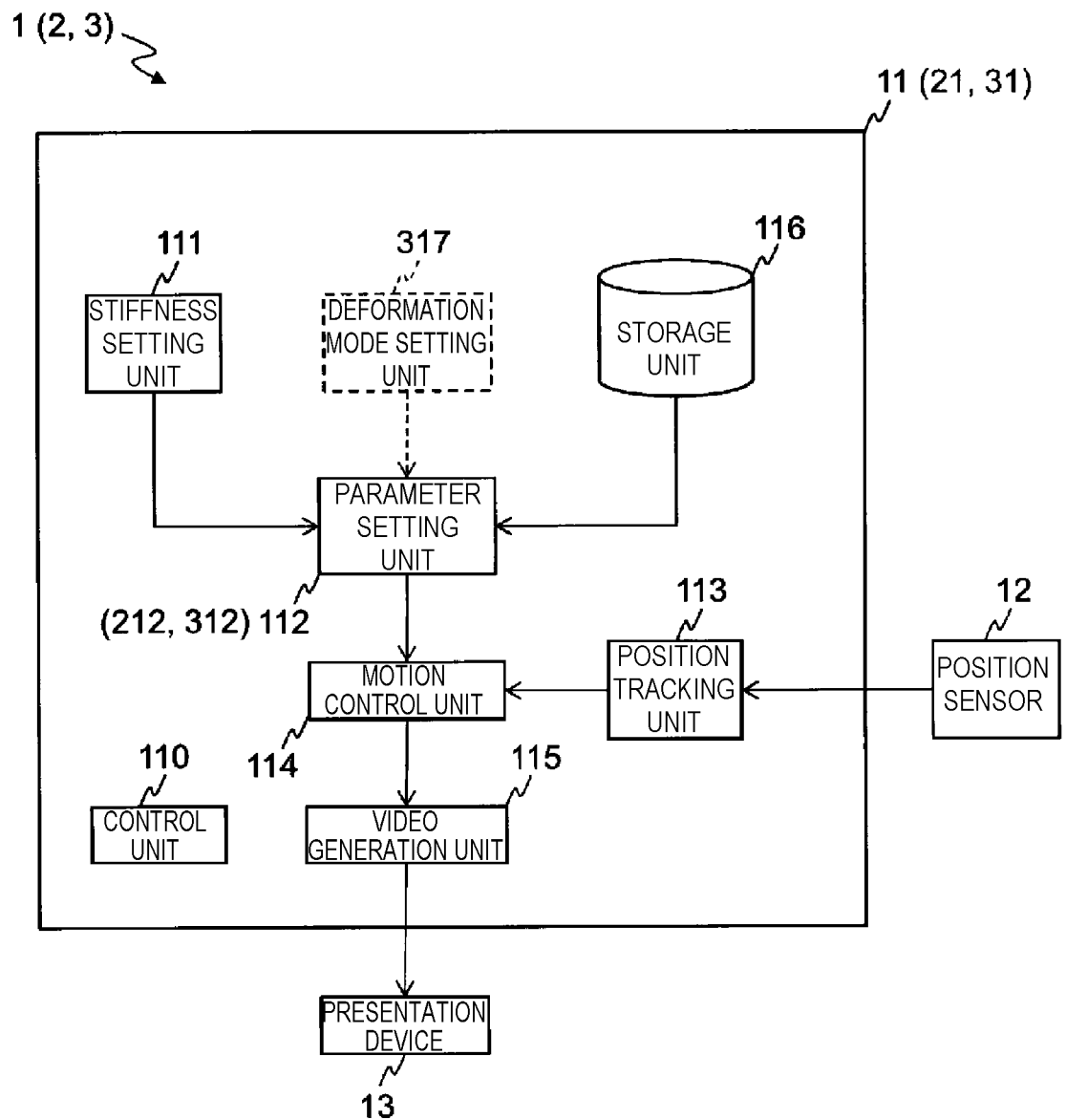

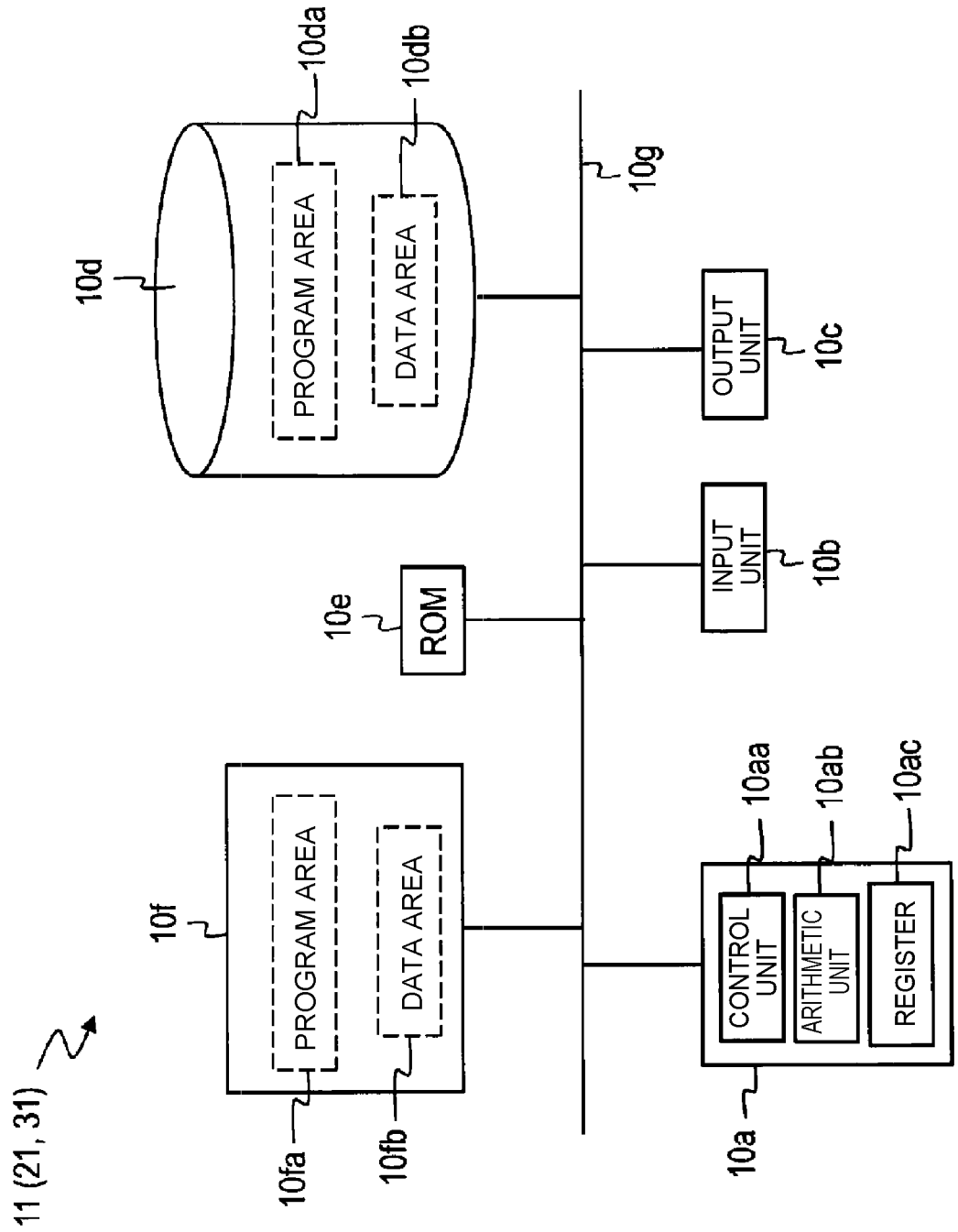

PSEUDO HAPTIC SENSE CONTROL APPARATUS, PSEUDO HAPTIC SENSE CONTROL METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/015219, filed on 2 Apr. 2020, the disclosure of which is hereby incorporated herein by reference in its entirety.

TECHNICAL FIELD

The present invention relates to a technology for causing a pseudo haptic sensation to be perceived.

BACKGROUND ART

Technologies for causing a pseudo haptic sensation to be perceived by using a mouse or a haptic sensation device are known (for example, see Non-Patent Literatures 1 and 2, and the like). Most of those are configured to delay a speed of feedback of a visual object on a screen in response to an input by a mouse or a haptic sensation device. Accordingly, it is possible to provide an impression that an object moves with a sense of resistance or an object made of a hard material is deformed.

CITATION LIST

Non-Patent Literature

Non-Patent Literature 1: A. Lecuyer, S. Coquillart, A. Kheddar, P. Richard, and P. Coiffet, "Pseudo-haptic feedback: can isometric input devices simulate force feedback?," Proc. IEEE Virtual Real. 2000 (Cat. No. 00CB37048), 2000.

Non-Patent Literature 2: F. Argelaguet, D. A. G. Jauregui, M. Marchal, and A. Lecuyer, "Elastic images: Perceiving local elasticity of images through a novel pseudo-haptic deformation effect," ACM Trans. Appl. Percept., vol. 10, no. 3, p. 17, 2013.

SUMMARY OF THE INVENTION

Technical Problem

On the other hand, in recent years, for example, an input operation is sometimes performed by a gesture in the air without using a haptic sensation device or a mouse in VR, AR, or the like. No technology for providing a pseudo haptic sensation in such a scene is known. Furthermore, no technology for providing a pseudo haptic sensation in response not only to an input operation but also to a gesture in the air is known.

An object of the present invention, which has been made in view of the aforementioned aspect, is to cause a pseudo haptic sensation to be perceived in response to a gesture in the air.

Means for Solving the Problem

A pseudo haptic sensation is perceived by visually presenting a situation in which an object is deformed in accordance with a pulling action or a pushing action by at least one body part. At this time, a rate of a magnitude of deformation of the object to a pulling amount of the pulling action or a pushing amount of the pushing action when providing a pseudo haptic sensation of a material having a first stiffness is higher than a rate of the magnitude of deformation of the object to a pulling amount of the pulling action or a pushing amount of the pushing action when providing a pseudo haptic sensation of a material having a second stiffness which is stiffer than the first stiffness.

Effects of the Invention

When the aforementioned object is presented, the pseudo haptic sensation can be perceived in response to the gesture in the air.

BRIEF DESCRIPTION OF DRAWINGS

FIG. 3 is a graph exemplifying a relationship between a distance between the hands (Hand distance) and an amount of deformation of the object (The magnitude of deformation) with regard to the ratio of the magnitude of deformation of the object to each distance between the hands (Deformation-distance ratio).

FIG. 4 is a graph exemplifying a relationship between the ratio of the magnitude of deformation of the object to each distance between the hands (Deformation-distance ratio) and the rating score for stiffness (Rating scores for stiffness) regarding each Poisson's ratio of the object.

FIG. 5 is a block diagram for exemplifying a functional configuration of the pseudo haptic sensation control device of the embodiment.

FIG. 6 is a block diagram exemplifying a hardware configuration of the pseudo haptic sensation control device of the embodiment.

DESCRIPTION OF EMBODIMENTS

Figure 1:
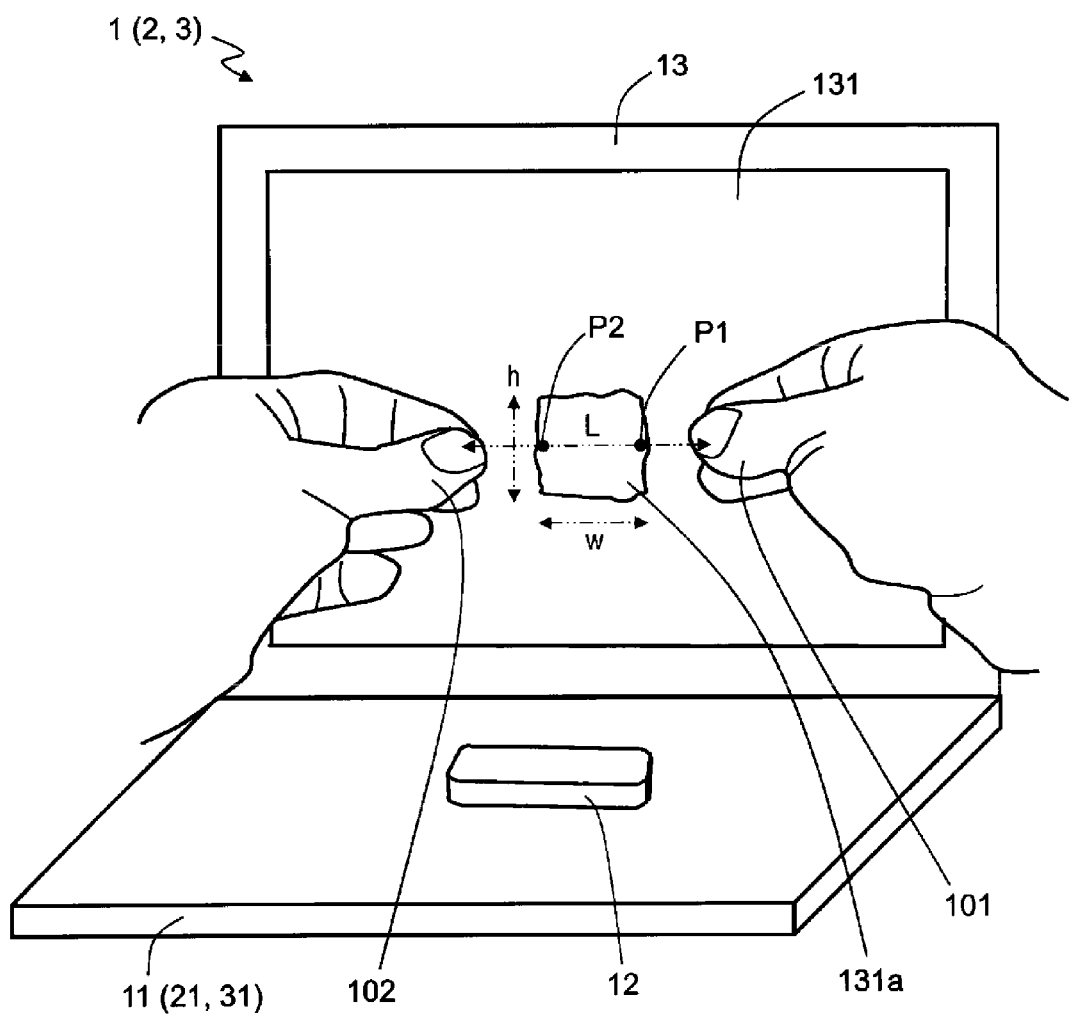
FIG. 1 is a diagram exemplifying an implementation of a pseudo haptic sensation control device of an embodiment.

Embodiments of the present invention will be described with reference to the drawings below.

First Embodiment

A first embodiment of the present invention will be described.

According to the present embodiment, an "object" on an image is deformed in accordance with a pulling action or a pushing action (for example, a pulling action or a pushing action in the air, that is, a gesture in the air) by at least one body part (for example, a hand) of a user, and this situation is visually presented to the user. Herein, the "pulling action" refers to an action for moving the body part to an outer side of the object relative to a reference position, and the "pushing action" refers to an action for moving the body part to an inner side of the object relative to the reference position. The "reference position" refers to a position of the body in an initial state before the object is deformed. The user who has viewed the object deformed in accordance with the pulling action or the pushing action perceives a pseudo haptic sensation (for example, a pseudo haptic sensation simulating an impression that is felt like rubber) by a false sense. At this time, by manipulating a rate (gradient) of the magnitude of deformation of the object to the pulling amount of the pulling action or the pushing amount of the pushing action, it is possible to cause pseudo haptic sensations of materials having different degrees of stiffness (or softness) to be perceived. In other words, the pseudo haptic sensation can be changed by manipulating the gradient for specifying how much the magnitude of deformation of the object is to be changed according to the pulling amount or the pushing amount. Specifically, as the rate of the magnitude of deformation of the object to the pulling amount or the pushing amount, that is, the gradient, is larger, a softer impression can be provided, and as the gradient is smaller, a stiffer impression can be provided. In other words, in response to an increase of the pulling amount or the pushing amount, a softer impression can be provided as the object is more quickly changed, and in contrast, a stiffer impression can be provided as the object is more slowly changed. That is, the rate of the magnitude of deformation to the pulling amount of the pulling action or the pushing amount of the pushing action (=the magnitude of deformation/the pulling amount or the pushing amount) when providing a pseudo haptic sensation of a material having a first stiffness is higher than the rate of the magnitude of deformation to the pulling amount of the pulling action or the pushing amount of the pushing action when providing a pseudo haptic sensation of a material having a second stiffness which is stiffer than the first stiffness. It should be noted that the "pulling amount" refers to a distance between the reference position and the body part after the pulling action or a function value of the distance between the reference position and the body part after the pulling action. The "pushing amount" refers to a distance between the reference position and the body part after the pushing action or a function value of the distance between the reference position and the body part after the pushing action. Specific examples will be illustrated below.

As exemplified in FIG. 1, a pseudo haptic sensation presentation system 1 of the first embodiment has a pseudo haptic sensation control device 11, a position sensor 12, and a presentation device 13. In FIG. 1, an example is illustrated where the pseudo haptic sensation control device 11 is configured by using a laptop personal computer, the display 13 of the laptop personal computer is used as the presentation device 13, and input equipment for an input operation by a gesture (for example, a device that tracks a position of a hand or a finger such as Leap Motion®) is used as the position sensor 12. However, this is merely an example, and is not intended to limit the present invention.

In the example of FIG. 1, an object 131a that is an image is displayed on a screen 131 of the presentation device 13. As if pinching the object 131a displayed on the display unit 131 by a finger 101 of the right hand and a finger 102 of the left hand (body parts) in the air, the user in the example moves the finger 101 of the right hand and the finger 102 of the left hand (to perform the pulling action or the pushing action) towards an outer side or an inner side (a pulling direction or a pushing direction) in a horizontal or substantially horizontal direction. Positions of the hands of the user are detected, for example, by the position sensor 12, and information on the detected positions of the hands of the user is sent to the pseudo haptic sensation control device 11. The pseudo haptic sensation control device 11 in this example uses the sent information of the positions of the hands and tracks the position of the finger 101 of the right hand and the position of the finger 102 of the left hand (for example, positions of the thumbs of the right hand and the left hand) to calculate a distance L (hand distance L) between the two positions. The pseudo haptic sensation control device 11 deforms the object 131a displayed on the screen 131, for example, according to the calculated hand distance L. The distance L is set by the pulling amount or the pushing amount relative to reference positions P1 and P2 of the fingers 101 and 102. The reference positions P1 and P2 in this example are positions of the fingers 101 and 102 (body parts) in the initial state before the object 131a is deformed. For example, positions at both ends of the object 131a in the initial state are respectively set as the reference positions P1 and P2 of the fingers 101 and 102. The pulling action in this example is an action for moving the fingers 101 and 102 towards the outer side of the object 131a relative to the reference positions P1 and P2, and the pushing action is an action for moving the fingers 101 and 102 towards the inner side of the object 131a relative to the reference positions P1 and P2. In addition, the pulling amount in this example is distances L1 and L2 between the reference positions P1 and P2 and the fingers 101 and 102 after the pulling action, and the pushing amount is the distances L1 and L2 between the reference positions P1 and P2 and the fingers 101 and 102 after the pushing action. The distance L is set by a distance (fixed) between the reference positions P1 and P2 and the distances L1 and L2. For this reason, deformation of the object 131a according to the distance L is synonymous with deformation of the object 131a according to the pulling amount of the pulling action or the pushing amount of the pushing action. Herein, as the rate (gradient) of the magnitude of deformation of the object to the distance L, in other words, the rate of the magnitude of deformation of the object to the pulling amount or the pushing amount is larger, a softer impression is provided, and as the rate is lower, a stiffer impression is provided.

A manner of deforming the object 131a will be exemplified below.

(A) Case of Pulling Action

In the pulling action in this example, the fingers 101 and 102 are moved in the horizontal or substantially horizontal direction (pulling direction) towards the outer side of the object 131a relative to the reference positions P1 and P2 (FIG. 1, and FIG. 2A to FIG. 2C).

For example, according to the pulling amount in the pulling direction relative to the reference positions P1 and P2 of the fingers 101 and 102, the pseudo haptic sensation control device 11 elongates the object 131a in a first expansion direction having the pulling direction component. For example, the pseudo haptic sensation control device 11 elongates the object 131a in the first expansion direction towards the outer side of the object 131a which is parallel or substantially parallel to the pulling direction. In at least a partial section, as the pulling amount is larger, a magnitude of expansion $d_x$ in the first expansion direction of the object 131a is larger. In addition, a ratio (synonymous with the "rate") of the magnitude of expansion $d_x$ in the first expansion direction to the pulling amount is determined in accordance with the stiffness of a material for providing a pseudo haptic sensation. In at least a part of the range, as the pseudo haptic sensation of a material with low stiffness (soft material) is to be more prominently provided, the ratio of the magnitude of expansion $d_x$ in the first expansion direction to the pulling amount is larger. In contrast, in at least a partial section, as the pseudo haptic sensation of a material with high stiffness (stiff material) is to be more prominently provided, the ratio of the magnitude of expansion $d_x$ in the first expansion direction to the pulling amount is smaller.

FIG. 3 exemplifies a relationship between a distance between the hands (Hand distance) L [cm] and a magnitude of expansion of the object 131a (The magnitude of deformation) $d_x$ [cm] with regard to the ratio of the magnitude of expansion $d_x$ [cm] of the object 131a (Deformation-distance ratio) to each distance between the hands L [cm]. In FIG. 3, ratios (gradients) in four stages from 1 to 4 are set. As a value of the ratio (gradient) is higher, the change amount of $d_x$ relative to the change amount of L is higher. That is, 1 indicates the lowest ratio, and 4 indicates the highest ratio. As the ratio is higher, a pseudo kinesthetic sensation of a material with low stiffness (soft material) can be presented, and in contrast, as the ratio is lower, a pseudo kinesthetic sensation of a material with high stiffness (stiff material) can be presented. As exemplified in FIG. 3, in at least a partial section, as the pseudo haptic sensation of a material with low stiffness (soft material) is to be more prominently provided, the ratio of the magnitude of expansion $d_x$ in the first expansion direction to the pulling amount is larger. In contrast, in at least a partial section, as the pseudo haptic sensation of a material with high stiffness (stiff material) is to be more prominently provided, the ratio of the magnitude of expansion $d_x$ in the first expansion direction to the pulling amount is smaller. It should be noted that in a range of L from 0 to 7.5, the magnitude of expansion $d_x$ of the object 131a is 0. This is because the fingers 101 and 102 are on the inner side relative to the reference positions P1 and P2 in the range and do not yet start the pulling action, and thus the pulling amount is 0, and the magnitude of expansion $d_x$ of the object 131a is also 0 accordingly.

Furthermore, the Poisson's effect may also be taken into account. The Poisson's effect is a physical phenomenon in which when an elastic object is elongated in a certain direction, compression in a direction orthogonal to it occurs. This phenomenon may be applied to the deformation of the object 131a. That is, the pseudo haptic sensation control device 11 may compress the object 131a in a first contraction direction towards the inner side of the object 131a having a direction component orthogonal to the first expansion direction according to the pulling amount relative to the reference positions P1 and P2 of the fingers 101 and 102 (FIG. 1, and FIG. 2A to FIG. 2C). For example, the pseudo haptic sensation control device 11 compresses the object 131a in the first contraction direction towards the inner side of the object 131a which is orthogonal to the first expansion direction. In at least a partial section, as the pulling amount is larger, a magnitude of contraction $d_y$ in the first contraction direction of the object 131a is higher. In addition, the ratio of the magnitude of contraction $d_y$ in the first contraction direction to the pulling amount is determined in accordance with the stiffness of a material for providing a pseudo haptic sensation. In at least a partial section, as the pseudo haptic sensation of the material with the low stiffness (soft material) is to be more prominently provided, the ratio of the magnitude of contraction $d_y$ in the first contraction direction to the pulling amount is larger. In contrast, in at least a partial section, as the pseudo haptic sensation of the material with the high stiffness (stiff material) is to be more prominently provided, the ratio of the magnitude of contraction $d_y$ in the first contraction direction to the pulling amount is smaller.

Figure 2A:
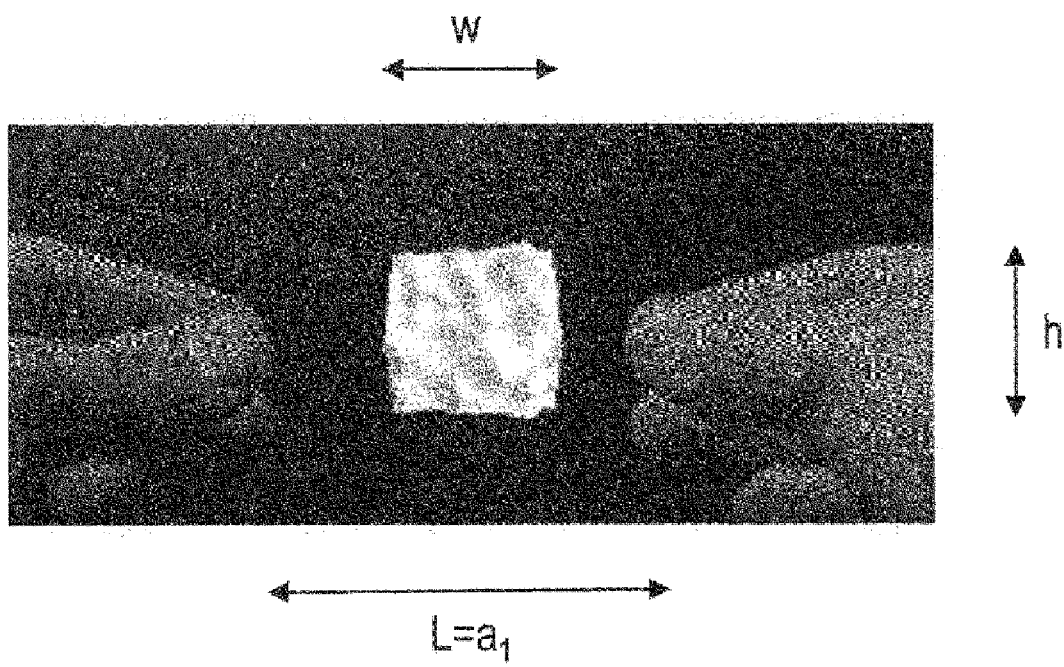
FIG. 2A to FIG. 2C are diagrams exemplifying a situation in which an object of the embodiment is deforming.
Figure 2B:
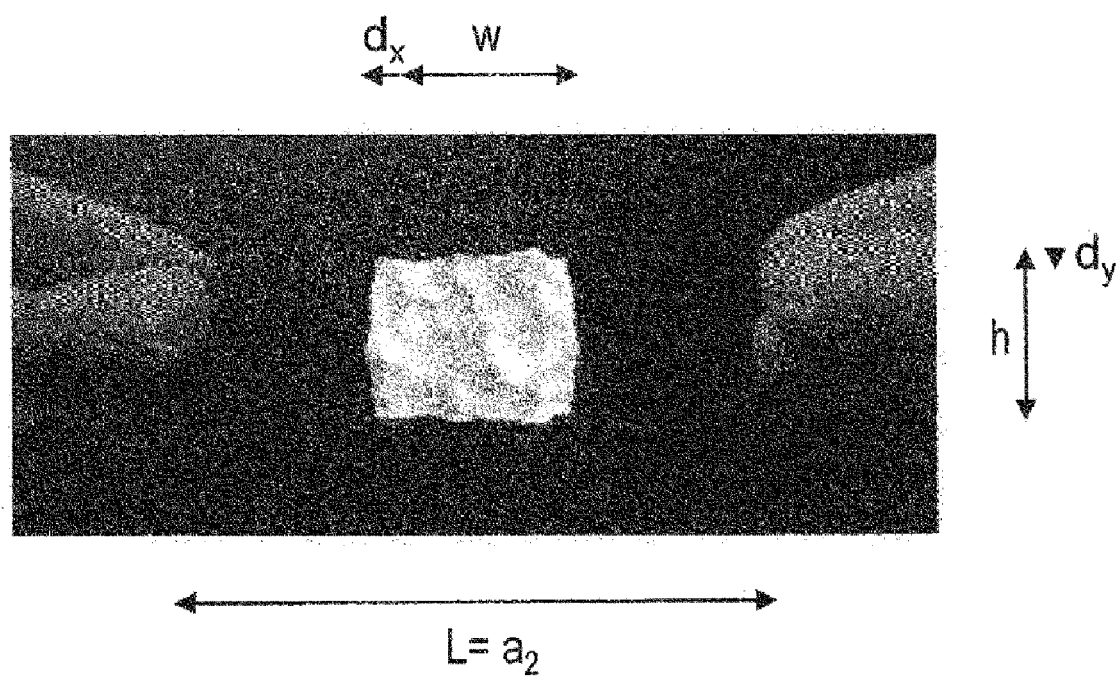
Figure 2C:
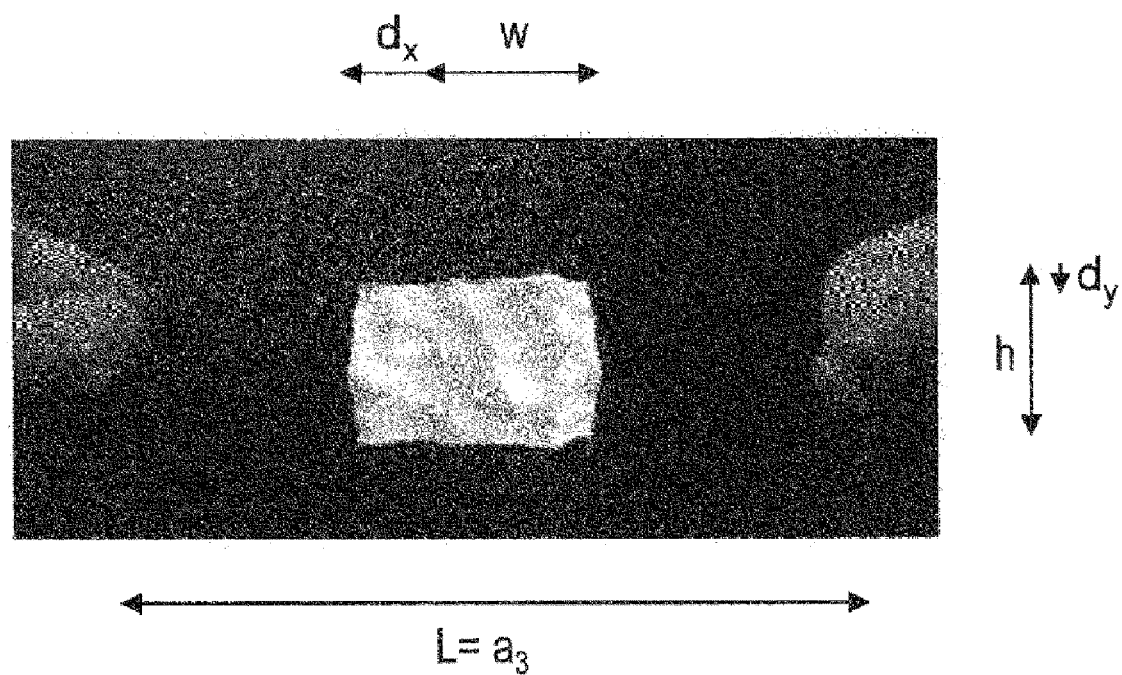

FIG. 2A to FIG. 2C exemplify a situation in a time series manner in which according to the pulling amount relative to the reference positions P1 and P2 of the fingers 101 and 102, the object 131a is elongated in the first expansion direction, and furthermore, the object 131a is compressed in the first contraction direction. The object 131a is elongated in the stated order of FIG. 2A, FIG. 2B, and FIG. 2C by the pulling action. As exemplified in FIG. 2A to FIG. 2C, as the pulling amount increases and the hand distance L is longer, the object 131a is further elongated in the first expansion direction and compressed in the first contraction direction.

FIG. 2A, FIG. 2B, and FIG. 2C respectively exemplify the situations when the hand distance L is $a_1$, $a_2$, and $a_3$. At this time, $a_1 < a_2 < a_3$ is satisfied. The object 131a is not elongated or compressed when L=$a_1$ (FIG. 2A), but is elongated in the first expansion direction and compressed in the first contraction direction when L=$a_2$ or $a_3$ (FIG. 2B and FIG. 2C). The magnitude of expansion $d_x$ when L=$a_3$ is higher than the magnitude of expansion $d_x$ when L=$a_2$, and the magnitude of contraction $d_y$ when L=$a_3$ is higher than the magnitude of contraction $d_y$ when L=$a_2$.

In addition, as a Poisson's ratio of the object 131a deformed in accordance with the pulling action is higher, the object is perceived as softer. Herein, a Poisson's ratio ν of the object 131a to the pulling action is defined as follows.

$$v = \left| \frac{\frac{d_y}{h}}{\frac{d_x}{w}} \right|$$ [Math. 1]

At this time, a length before the elongation in the first expansion direction of the object 131a is set as h, a length before the compression in the first contraction direction is set as w, a magnitude of expansion in the first expansion direction (change amount in comparison with the length before the elongation) is set as $d_x$, and a magnitude of contraction in the first contraction direction (change amount in comparison with the length before the compression) is set as $d_y$. For this reason, in at least a partial section, the pseudo haptic sensation control device 11 may increase the Poisson's ratio ν of the object 131a as the pseudo haptic sensation of the material with the low stiffness (soft material) is to be more prominently provided. In contrast, in at least a partial section, the pseudo haptic sensation control device 11 may decrease the Poisson's ratio ν of the object 131a as the pseudo haptic sensation of the material with the high stiffness (stiff material) is to be more prominently provided. By controlling the Poisson's ratio ν in this manner, the pseudo haptic sensation to be perceived may be controlled. It should be noted that the Poisson's ratio ν of a material of an object is not higher than or equal to 0.5 in the physical world, but the Poisson's ratio ν of the object 131a that is an image may be higher than or equal to 0.5. It should be noted, however, that when the Poisson's ratio ν is set to be excessively high, this is not recognized as the Poisson's effect naturally caused when an actual material is pulled, and a sense of discomfort is caused. In a case of the above described example, an upper limit of the Poisson's ratio ν at which the sense of discomfort is not provided depends on the length h of the object (or a ratio of the length h to the length w). For example, an upper limit value of the Poisson's ratio ν that can be used is approximately 0.3 in a case where an aspect ratio of the object is h:w=1:2, approximately 0.8 in a case of h:w=1:1, and approximately 1.3 in a case of h:w=2:1.

FIG. 4 exemplifies a relationship obtained by experiments between respective deformation-distance ratios of the magnitudes of deformation of the object 131a to the hand distances L and rating scores for stiffness. The experiments are performed by three types of the Poisson's ratios ν=0, 0.25, and 0.5, and the rating scores for stiffness are obtained from 12 human subjects. The rating scores represent that the stiffness is lower (softer) as a value is lower, in which 1 corresponds to the softest impression, and 5 corresponds to the hardest impression. An error bar represents a standard error. From FIG. 4, it is understood that the softer pseudo haptic sensation is perceived in a case where the Poisson's ratio ν is set as 0.5 as compared with a case where the Poisson's ratio is set as 0.25 or 0.

In addition, according to the pulling amount relative to the reference positions P1 and P2, the pseudo haptic sensation control device 11 may compress the object 131a in the first contraction direction as described above without elongating the object 131a in the first expansion direction having the pulling direction component. Accordingly, too, a similar pseudo haptic sensation can be provided.

(B) Case of Pushing Action

In the pushing action in this example, the fingers 101 and 102 are moved in a horizontal or substantially horizontal direction (pushing direction) towards the inner side of the object 131a relative to the reference positions P1 and P2.

For example, according to the pushing amount in the pushing direction relative to the reference positions P1 and P2 of the fingers 101 and 102, the pseudo haptic sensation control device 11 compresses the object 131a in a second contraction direction having a pushing direction component. For example, the pseudo haptic sensation control device 11 compresses the object 131a in the second contraction direction towards the inner side of the object 131a parallel to or substantially parallel to the pushing direction. In at least a partial section, as the pushing amount is larger, the magnitude of contraction $d_x$ in the second contraction direction of the object 131a is higher. In addition, the ratio of the magnitude of contraction $d_x$ in the second contraction direction to the pushing amount is determined in accordance with the stiffness of a material for providing a pseudo haptic sensation. In at least a partial section, as the pseudo haptic sensation of the material with the low stiffness (soft material) is to be more prominently provided, the ratio of the magnitude of contraction $d_x$ in the second contraction direction to the pushing amount is larger. In contrast, in at least a partial section, as the pseudo haptic sensation of the material with the high stiffness (stiff material) is to be more prominently provided, the ratio of the magnitude of contraction $d_x$ in the second contraction direction to the pushing amount is smaller.

Furthermore, similarly as in the case of the pulling action, the Poisson's effect may be applied to the deformation of the object 131a in the case of the pushing action, too. That is, according to the pushing amount relative to the reference positions P1 and P2 of the fingers 101 and 102, the pseudo haptic sensation control device 11 may elongate the object 131a in a second expansion direction towards the outer side of the object 131a having a direction component orthogonal to the second contraction direction. For example, the pseudo haptic sensation control device 11 elongates the object 131a in the second expansion direction towards the outer side of the object 131a which is orthogonal to the second contraction direction. In at least a partial section, as the pushing amount is larger, the magnitude of expansion $d_y$ in the second expansion direction of the object 131a is higher. In addition, the ratio of the magnitude of expansion $d_y$ in the second expansion direction to the pushing amount is determined in accordance with the stiffness of a material for providing a pseudo haptic sensation. In at least a partial section, as the pseudo haptic sensation of the material with the low stiffness (soft material) is to be more prominently provided, the ratio of the magnitude of expansion $d_y$ in the second expansion direction to the pushing amount is larger. In contrast, in at least a partial section, as the pseudo haptic sensation of the material with the high stiffness (stiff material) is to be more prominently provided, the ratio of the magnitude of expansion $d_y$ in the second expansion direction to the pushing amount is smaller.

In addition, as the Poisson's ratio of the object 131a deformed in accordance with the pushing action is higher, the object is perceived as softer. Herein, the Poisson's ratio ν of the object 131a to the pushing action is defined as follows.

$$\nu = \left| \frac{\frac{d_y}{h}}{\frac{d_x}{w}} \right|$$ [Math. 2]

At this time, a length before the compression in the second contraction direction of the object 131a is set as h, a length before the elongation in the second expansion direction is set as w, a magnitude of contraction in the second contraction direction (change amount in comparison with the length before the compression) $d_x$ is set, and a magnitude of expansion in the second expansion direction is set as $d_y$ (change amount in comparison with the length before the elongation). For this reason, in at least a partial section, the pseudo haptic sensation control device 11 may increase the Poisson's ratio ν of the object 131a as the pseudo haptic sensation of the material with the low stiffness (soft material) is to be more prominently provided. In contrast, in at least a partial section, the pseudo haptic sensation control device 11 may decrease the Poisson's ratio ν of the object 131a as the pseudo haptic sensation of the material with the high stiffness (stiff material) is to be more prominently provided. The pseudo haptic sensation to be perceived may be controlled by controlling the Poisson's ratio ν in this manner. A range of the Poisson's ratio ν is the same as that in the case of the pulling action.

In addition, according to the pushing amount relative to the reference positions P1 and P2, the pseudo haptic sensation control device 11 may elongate the object 131a in the second expansion direction as described above without compressing the object 131a in the second contraction direction having the pushing direction component. Accordingly, too, a similar pseudo haptic sensation can be provided.

The pseudo haptic sensation control device 11 may deform the object 131a as described above by only the pulling action, may deform the object 131a as described above by only the pushing action, and may deform the object 131a as described above by both the pulling action and the pushing action. Upper limits of $d_x$ and $d_y$ may be set or may not be set.

In addition, body parts that perform the pulling action or the pushing action do not necessarily need to be the fingers 101 and 102 of both hands. These may be other parts of the hands such as palms, may be legs, or may be other body parts. The body parts do not necessarily need to be two parts, and the pulling amount or the pushing amount may be specified according to a distance between a single body part and another part such as a wall or another person. The pulling action or the pushing action may be performed in a state in which any object is in contact with the body part. For example, the pulling action or the pushing action may be performed in a state in which a hand holds any object. It should be noted, however, that an impression to be provided may be affected by a feel of a material or the like of an object in contact with the body part.

In addition, the pulling direction or the pushing direction may not be the horizontal or substantially horizontal direction. For example, the pulling direction or the pushing direction may be a vertical direction or a substantially vertical direction, or may be a direction between the horizontal direction and the vertical direction.

The object 131a may have any shape, and may or may not have a pattern. It should be noted, however, that a pattern may be provided on the object 131a, and the pattern of the object 131a may be deformed in accordance with the pulling action or the pushing action. That is, when the pulling action is performed, the pattern may expand in the first expansion direction having the pulling direction component of the pulling action, and/or the pattern may contract in the first contraction direction having the direction component orthogonal to the first expansion direction. For example, polka-dot patterns may be provided on the object 131a, and each polka dot may be deformed into an elliptical shape when the pulling action is performed. Similarly, when the pushing action is performed, the pattern may contract in the second contraction direction having the pushing direction component of the pushing action, and/or the pattern may expand in the second expansion direction having the direction component orthogonal to the second contraction direction. In addition, the object 131a is an image, but an object other than an image may be used as the "object" as long as its shape can be controlled. For example, a three-dimensional object of which shape can be controlled may be used as the "object", or an object of which shape can be controlled by arranging particles in any position in the air by ultrasonic waves may be used as the "object".

The following is a summary of the above.

The pseudo haptic sensation control device 11 obtains the magnitude of deformation of the object deformed in accordance with the pulling action or the pushing action by at least one body part. At this time, the rate of the magnitude of deformation to the pulling amount of the pulling action or the pushing amount of the pushing action when providing the pseudo haptic sensation of the material having the first stiffness is higher than the rate of the magnitude of deformation to the pulling amount of the pulling action or the pushing amount of the pushing action when providing the pseudo haptic sensation of the material having the second stiffness which is stiffer than the first stiffness. By visually presenting the object in this manner, the pseudo haptic sensation can be perceived.

Preferably, the pseudo haptic sensation control device 11 obtains at least one of the magnitude of expansion in the first expansion direction having the pulling direction component of the pulling action and the magnitude of contraction in the first contraction direction having the direction component orthogonal to the first expansion direction of the object deformed in accordance with the pulling action by at least one first body part, and/or obtains at least one of the magnitude of contraction in the second contraction direction having the pushing direction component of the pushing action and the magnitude of expansion in the second expansion direction having the direction component orthogonal to the second contraction direction of the object deformed in accordance with the pushing action by at least one second body part. At this time, the rate of the magnitude of expansion in the first expansion direction to the pulling amount of the pulling action when providing the pseudo haptic sensation of the material having the first stiffness is higher than the rate of the magnitude of expansion in the first expansion direction to the pulling amount of the pulling action when providing the pseudo haptic sensation of the material having the second stiffness which is stiffer than the first stiffness. The rate of the magnitude of contraction in the first contraction direction to the pulling amount of the pulling action when providing the pseudo haptic sensation of the material having the first stiffness is higher than the rate of the magnitude of contraction in the first contraction direction to the pulling amount of the pulling action when providing the pseudo haptic sensation of the material having the second stiffness. The rate of the magnitude of contraction in the second contraction direction to the pushing amount of the pushing action when providing the pseudo haptic sensation of the material having the first stiffness is higher than the rate of the magnitude of contraction in the second contraction direction to the pushing amount of the pushing action when providing the pseudo haptic sensation of the material having the second stiffness. The rate of the magnitude of expansion in the second expansion direction to the pushing amount of the pushing action when providing the pseudo haptic sensation of the material having the first stiffness is higher than the rate of the magnitude of expansion in the second expansion direction to the pushing amount of the pushing action when providing the pseudo haptic sensation of the material having the second stiffness.

Preferably, the pseudo haptic sensation control device 11 obtains both the magnitude of expansion in the first expansion direction and the magnitude of contraction in the first contraction direction, and/or obtains both the magnitude of contraction in the second contraction direction and the magnitude of expansion in the second expansion direction. Accordingly, the pseudo haptic sensation can be more clearly perceived.

Preferably, the Poisson's ratio related to the magnitude of expansion and the magnitude of contraction of the object in a case where the pulling action or the pushing action is performed when providing a pseudo haptic sensation of a material having the first stiffness is higher than the Poisson's ratio related to the magnitude of expansion and the magnitude of contraction of the object in a case where the pulling action or the pushing action is performed when providing a pseudo haptic sensation of a material having the second stiffness. Accordingly, a difference in stiffness can be more clearly perceived.

Next, a functional configuration of the pseudo haptic sensation control device 11 and details of the processing will be exemplified.

<Functional Configuration>

As exemplified in FIG. 5, the pseudo haptic sensation control device 11 of the present embodiment has a control unit 110, a stiffness setting unit 111, a parameter setting unit 112, a position tracking unit 113, a motion control unit 114, a video generation unit 115, and a storage unit 116, and is connected to the position sensor 12 and the presentation device 13 such that data communication can be performed to each other. The pseudo haptic sensation control device 11 executes each of the processes under the control of the control unit 110.

<Preprocessing>

As preprocessing, the storage unit 116 stores information for specifying the magnitude of deformation of the object 131a relative to the pulling amount and/or the pushing amount with regard to each degree of stiffness for which a pseudo haptic sensation is to be presented. For example, information for specifying the ratio (gradient) of the magnitude of deformation of the object 131a to the pulling amount and/or the pushing amount may be stored, or information for specifying the ratio (gradient) of the magnitude of deformation of the object 131a to the distance between the body parts involved or the distance between the body part involved and another part corresponding to the pulling amount and/or the pushing amount may be stored. Examples of the magnitude of deformation are the magnitude of expansion and the magnitude of contraction which are described above. Furthermore, the information for specifying the Poisson's ratio to the magnitude of expansion and the magnitude of contraction of the object when the pulling action or the pushing action is performed may be stored in the storage unit 116. These pieces of information may be presented as a reference table or a function.
<Processing>

The stiffness setting unit 111 sets a stiffness for which a pseudo haptic sensation is to be presented based on an input value or any arithmetic result, and outputs information for specifying the stiffness to the parameter setting unit 112 (step S111). The parameter setting unit 112 extracts, from the storage unit 116, information for specifying the magnitude of deformation of the object 131a relative to the pulling amount and/or the pushing amount corresponding to the stiffness. The parameter setting unit 112 receives, as inputs, the information for specifying the stiffness and the information for specifying the magnitude of deformation of the object 131a relative to the pulling amount and/or the pushing amount corresponding to the stiffness. Then, the parameter setting unit 112 uses these pieces of information, and sets and outputs, to the motion control unit 114, a parameter necessary for specifying the magnitude of deformation of the object 131a corresponding to the set stiffness based on the information corresponding to the pulling amount and/or the pushing amount (for example, the hand distance L described above). In addition, in a case where information for specifying the Poisson's ratio of the object 131a is stored in the storage unit 116, the parameter setting unit 112 may further use this information, and set and output, to the motion control unit 114, a parameter necessary for specifying the magnitude of deformation of the object 131a corresponding to the set stiffness and the Poisson's ratio based on the information corresponding to the pulling amount and/or the pushing amount. For example, in a case where the lowest stiffness "1" is set by the stiffness setting unit 111, the rate of the magnitude of expansion $d_x$ in the first expansion direction to the pulling amount corresponding to the stiffness "1" is a rate indicated by "4" in FIG. 3, and also the Poisson's ratio is set as 0.5, the parameter setting unit 112 may set and output, to the motion control unit 114, a parameter indicating that the rate of the magnitude of expansion $d_x$ in the first expansion direction to the pulling amount is the rate indicated by "4" and the Poisson's ratio is 0.5 (step S112).

As described above, the position sensor 12 detects a position of at least one body part (for example, a hand) of the user in real time, and sends the detection result to the position tracking unit 113. The position tracking unit 113, based on the detection result, obtains and sends, to the motion control unit 114, information corresponding to the pulling amount and/or the pushing amount (for example, the distance L described above) (step S113). Timing of the detection is desirably set by taking into account a frame rate of video which will be generated in a later stage. To avoid interpolation of the detection result, for example, in a case where the image is displayed at 60 Hz, the detection is desirably performed by the position sensor 12 at least every 16.7 milliseconds.

The motion control unit 114 receives, as inputs, the parameter sent from the parameter setting unit 112 and the information corresponding to the pulling amount and/or the pushing amount which is sent from the position tracking unit 113, and obtains and outputs the magnitude of deformation of the object for causing the pseudo haptic sensation to be perceived by visually presenting a situation in which the object is deformed in accordance with the pulling action or the pushing action by at least one body part. At this time, the rate of the magnitude of deformation to the pulling amount of the pulling action or the pushing amount of the pushing action when providing the pseudo haptic sensation of the material having the first stiffness is higher than the rate of the magnitude of deformation to the pulling amount of the pulling action or the pushing amount of the pushing action when providing the pseudo haptic sensation of the material having the second stiffness which is stiffer than the first stiffness.

For example, the motion control unit 114 obtains and outputs at least one of the magnitude of expansion in the first expansion direction having the pulling direction component of the pulling action and the magnitude of contraction in the first contraction direction having the direction component orthogonal to the first expansion direction of the object for causing the pseudo haptic sensation to be perceived by visually presenting a situation in which the deformation occurs in accordance with the pulling action by at least one first body part, and/or obtains and outputs at least one of the magnitude of contraction in the second contraction direction having the pushing direction component of the pushing action and the magnitude of expansion in the second expansion direction having the direction component orthogonal to the second contraction direction of the object for causing the pseudo haptic sensation to be perceived by visually presenting a situation in which the deformation occurs in accordance with the pushing action by at least one second body part. At this time, the rate of the magnitude of expansion in the first expansion direction to the pulling amount of the pulling action when providing the pseudo haptic sensation of the material having the first stiffness is higher than the rate of the magnitude of expansion in the first expansion direction to the pulling amount of the pulling action when providing the pseudo haptic sensation of the material having the second stiffness which is stiffer than the first stiffness, the rate of the magnitude of contraction in the first contraction direction to the pulling amount of the pulling action when providing the pseudo haptic sensation of the material having the first stiffness is higher than the rate of the magnitude of contraction in the first contraction direction to the pulling amount of the pulling action when providing the pseudo haptic sensation of the material having the second stiffness, the rate of the magnitude of contraction in the second contraction direction to the pushing amount of the pushing action when providing the pseudo haptic sensation of the material having the first stiffness is higher than the rate of the magnitude of contraction in the second contraction direction to the pushing amount of the pushing action when providing the pseudo haptic sensation of the material having the second stiffness, and the rate of the magnitude of expansion in the second expansion direction to the pushing amount of the pushing action when providing the pseudo haptic sensation of the material having the first stiffness is higher than the rate of the magnitude of expansion in the second expansion direction to the pushing amount of the pushing action when providing the pseudo haptic sensation of the material having the second stiffness (step S114).

The video generation unit 115 uses the magnitude of deformation of the object (for example, the magnitude of expansion in the first expansion direction, the magnitude of contraction in the first contraction direction, the magnitude of contraction in the second contraction direction, or the magnitude of expansion in the second expansion direction) output from the motion control unit 114, and generates and outputs video of the object deformed in accordance with this magnitude of deformation (step S115). For example, in a case where the video to be displayed at 60 Hz is generated, an image in which the object is deformed is generated at every 16.7 milliseconds based on the magnitude of deformation of the object which is output from the motion control unit 114. By taking into account that a time width of a human motion detector is approximately 100 milliseconds, a lower limit of the frame rate of the video is desirably set as approximately 10 Hz.

The presentation device 13 receives, as an input, and presents the video output from the video output from the video generation unit 115. In the example of FIG. 1, the presentation device 13 displays the object 131a in the video on the screen 131.

Second Embodiment

A second embodiment of the present invention will be described. The second embodiment is different from the first embodiment in only that the Poisson's ratio of the object is automatically selected according to the set stiffness. Differences from the items described above will be mainly described below, and descriptions on the items already described will be simplified by using the same reference numerals.

<Functional Configuration>

As exemplified in FIG. 1, a pseudo haptic sensation presentation system 2 of the second embodiment has a pseudo haptic sensation control device 21, the position sensor 12, and the presentation device 13. As exemplified in FIG. 5, the pseudo haptic sensation control device 21 of the present embodiment has the control unit 110, the stiffness setting unit 111, a parameter setting unit 212, the position tracking unit 113, the motion control unit 114, the video generation unit 115, and the storage unit 116, and is connected to the position sensor 12 and the presentation device 13 such that data communication can be performed to each other. The pseudo haptic sensation control device 21 executes each of the processes under the control of the control unit 110.

<Preprocessing>

The difference from the first embodiment is that with regard to each degree of stiffness for which the pseudo haptic sensation is to be presented, the information for specifying the magnitude of deformation of the object 131a relative to the pulling amount and/or the pushing amount and the information for specifying the Poisson's ratio of the object to the magnitude of expansion and the magnitude of contraction of the object when performing the pulling action or the pushing action are stored in the storage unit 116.

<Processing>

The difference from the first embodiment is that the following step S212 is to be executed instead of step S112. In step S212, the information for specifying the stiffness set in step S111 is input to the parameter setting unit 112, and the parameter setting unit 112 extracts the information for specifying the magnitude of deformation of the object 131a relative to the pulling amount and/or the pushing amount corresponding to the stiffness, and the information for specifying the Poisson's ratio from the storage unit 116. The parameter setting unit 112 uses these pieces of information, and sets a parameter necessary for specifying the magnitude of deformation of the object 131a corresponding to the set stiffness and the Poisson's ratio of the stiffness from the information corresponding to the pulling amount and/or the pushing amount. The parameter is output to the motion control unit 114 (step S212). The rest is the same as the first embodiment.

Third Embodiment

A third embodiment of the present invention will be described. The third embodiment is a modified example of the first and second embodiments. The third embodiment is different from the first or second embodiment in that deformation modes of the object 131a can be set. The rest is the same as the first or second embodiment. That is, as described above, the deformation of the object 131a is at least any of the expansion in the first expansion direction having the pulling direction component of the pulling action, the contraction in the first contraction direction having the direction component orthogonal to the first expansion direction, the contraction in the second contraction direction having the pushing direction component of the pushing action, and the expansion in the second expansion direction having the direction component orthogonal to the second contraction direction. In addition, the Poisson's ratio to the magnitude of expansion and the magnitude of contraction of the object when the pulling action or the pushing action is performed may be or may not be designated. According to the present embodiment, these deformation modes of the object 131a can be set.

<Functional Configuration>

As exemplified in FIG. 1, a pseudo haptic sensation presentation system 3 of the third embodiment has a pseudo haptic sensation control device 31, the position sensor 12, and the presentation device 13. As exemplified in FIG. 5, the pseudo haptic sensation control device 31 of the present embodiment has the control unit 110, the stiffness setting unit 111, a parameter setting unit 312, the position tracking unit 113, the motion control unit 114, the video generation unit 115, the storage unit 116, and a deformation mode setting unit 317, and is connected to the position sensor 12 and the presentation device 13 such that data communication can be performed to each other. The pseudo haptic sensation control device 31 executes each of the processes under the control of the control unit 110.

<Preprocessing>

This is the same as the second embodiment.

<Processing>

The difference from the first embodiment is that the presence or absence of designation of the deformation mode and the Poisson's ratio can be set by the deformation mode setting unit 317, and that the following step S312 is to be executed instead of step S112.

The deformation mode setting unit 317 sets the deformation mode of the object 131a based on an input value or any arithmetic result. The deformation mode of the object 131a is any of the expansion in the first expansion direction having the pulling direction component of the pulling action, the contraction in the first contraction direction having the direction component orthogonal to the first expansion direction, the contraction in the second contraction direction having the pushing direction component of the pushing action, and the expansion in the second expansion direction having the direction component orthogonal to the second contraction direction, or a combination of these, and the presence or absence of the designation of the Poisson's ratio. The information for specifying the set deformation mode of the object 131a is sent to the parameter setting unit 312 (step S317).

The information for specifying the stiffness set in the parameter setting unit 112 by the stiffness setting unit 111, and the information for specifying the deformation mode of the object 131a set by the deformation mode setting unit 317 are input to the parameter setting unit 312. The parameter setting unit 312 extracts, from the storage unit 116, the information for specifying the magnitude of deformation of the object 131a, which is in the deformation mode of the object 131a set in step S317 corresponding to the stiffness set by the stiffness setting unit 111. The parameter setting unit 312 sets a parameter for performing the deformation corresponding to the set contents in the deformation mode setting unit 317 on the object 131a based on this information. The parameter is output to the motion control unit 114 (step S212). The rest is the same as the first embodiment.

[Hardware Configuration]

The pseudo haptic sensation control device 11, 21, or 31 according to each of the embodiments is, for example, a device configured when a general-use or dedicated-use computer provided with a processor (hardware processor) such as a CPU (central processing unit), a memory such as a RAM (random-access memory) or a ROM (read-only memory), and the like executes a predetermined program. This computer may be provided with one processor and one memory, or may be provided with a plurality of processors and a plurality of memories. This program may be installed in the computer, or may be previously recorded in the ROM or the like. In addition, a part or all of the processing units may be configured by using electronic circuitry that realizes processing functions alone instead of using electronic circuitry like CPU that realizes the processing functions by reading the program. In addition, electronic circuitry that configures one device may include a plurality of CPUs.

FIG. 6 is a block diagram exemplifying a hardware configuration of the pseudo haptic sensation control device 11, 21, or 31 according to each of the embodiments. As exemplified in FIG. 6, the pseudo haptic sensation control device 11, 21, or 31 in this example has a CPU (Central Processing Unit) 10a, an input unit 10b, an output unit 10c, a RAM (Random Access Memory) 10d, a ROM (Read Only Memory) 10e, an auxiliary storage device 10f, and a bus 10g. The CPU 10a in this example has a control unit 10aa, an arithmetic unit 10ab, and a register 10ac, and executes various arithmetic processes in accordance with various types of programs read in the register 10ac. In addition, the input unit 10b is an input terminal to which data is input, a keyboard, a mouse, a touch panel, or the like. In addition, the output unit 10c is an output terminal from which data is output, a display, a LAN card controlled by the CPU 10a that has read a predetermined program, or the like. In addition, the RAM 10d is an SRAM (Static Random Access Memory), a DRAM (Dynamic Random Access Memory), or the like, and has a program area 10da in which a predetermined program is stored, and a data area 10db in which various types of data are stored. In addition, the auxiliary storage device 10f is, for example, a hard disc, an MO (Magneto-Optical disc), a semiconductor memory, or the like, and has a program area 10fa in which a predetermined program is stored and a data area 10fb in which various types of data are stored. In addition, the bus 10g connects the CPU 10a, the input unit 10b, the output unit 10c, the RAM 10d, the ROM 10e, and the auxiliary storage device 10f such that exchange of information can be performed between them. The CPU 10a writes the program stored in the program area 10fa of the auxiliary storage device 10f to the program area 10da of the RAM 10d in accordance with an OS (Operating System) program that has been read. Similarly, the CPU 10a writes the various types of data stored in the data area 10fb of the auxiliary storage device 10f to the data area 10db of the RAM 10d. Then, addresses on the RAM 10d at which this program and the data are written are stored in the register 10ac of the CPU 10a. The control unit 10aa of the CPU 10a sequentially reads out these addresses stored in the register 10ac, reads out the program or data from the area on the RAM 10d which is indicated by the read address, causes the arithmetic unit 10ab to sequentially execute an arithmetic operation indicated by the program, and stores the arithmetic result in the register 10ac. With the aforementioned configuration, the functional configurations of the pseudo haptic sensation control device 11, 21, or 31 are realized.

The above described program can be recorded in a computer-readable recording medium. An example of the computer-readable recording medium is a non-transitory recording medium. Examples of the aforementioned recording medium are a magnetic recording device, an optical disc, an opto-magnetic recording medium, a semiconductor memory, and the like.

Circulation of this program is performed, for example, by sale, handover, lease, or the like of a portable recording medium such as a DVD or a CD-ROM on which the program is recorded. Furthermore, a configuration may be adopted in which this program is stored in a storage device of a server computer, and the program is transferred from the server computer to another computer via a network to circulate this program. As described above, first, the computer that executes the aforementioned program temporarily stores the program recorded on the portable recording medium or the program transferred from the server computer, for example, in its own storage device. Then, at the time of execution of the processing, this computer reads the program stored in its own storage device, and executes the processing in accordance with the read program. In addition, as another execution mode of this program, the computer may directly read the program from the portable recording medium and execute the processing in accordance with the program, and furthermore, may consecutively execute the processing in accordance with the received program each time the program is transferred to this computer from the server computer. In addition, a configuration may be adopted in which the above described processing is executed by a so-called ASP (Application Service Provider) type service where the transfer of the program from the server computer to this computer is not performed, but the processing functions are realized instead by execution instructions and acquisition of the results. It should be noted that the program according to the present mode includes information used for processing by an electronic computer which is a quasi-program (such as data that is not a direct instruction to the computer but has a property for prescribing the processing of the computer).

According to the respective embodiments, the present device is configured by executing the predetermined program on the computer, but at least a part of these processing contents may be realized in a hardware manner.

It should be noted that the present invention is not limited to the above described embodiments. For example, the object may be projected on a screen by a projection device, or may be displayed by smart glasses or the like. In addition, the above described various types of processing may be not only executed in a time series manner in accordance with the descriptions but also executed in a parallel manner or separately according to a processing capacity of the device that executes the processing or according to need. In addition to the above, appropriate alterations can be of course made within the scope without departing from the gist of the present invention.

INDUSTRIAL APPLICABILITY

According to the present invention, a pseudo haptic sensation such as stiffness and softness can be provided for an object on a screen which is deformed following a gesture in the air, for example. In addition, by manipulating the rate (gradient) of the magnitude of deformation of the object to a pulling amount or a pushing amount by a body part, it is possible to manipulate the stiffness and softness of the object. When a Poisson's ratio is set to be higher, the softness of the object can be further increased. According to the present invention, for example, also in a scene in which a haptic sensation device is not often used, such as in VR, AR, or the like, a pseudo haptic sensation can be presented to the user, and accordingly, the range of haptic sensation expressions in VR or AR is widened.

REFERENCE SIGNS LIST 11, 21, 31 Pseudo haptic sensation control device

The invention claimed is:

1. A pseudo haptic sensation control device comprising a processor configured to execute a method comprising:
obtaining and outputting a magnitude of deformation of an object for causing a pseudo haptic sensation to be perceived by visually presenting a situation in which the object is deformed in accordance with a pulling action or a pushing action by at least one body part, wherein
a rate of the magnitude of deformation to a pulling amount of the pulling action or a pushing amount of the pushing action when providing a pseudo haptic sensation of a material having a first stiffness is higher than a rate of the magnitude of deformation to a pulling amount of the pulling action or a pushing amount of the pushing action when providing a pseudo haptic sensation of a material having a second stiffness which is stiffer than the first stiffness.

2. The pseudo haptic sensation control device according to claim 1, wherein the object includes an image.

3. A pseudo haptic sensation control device comprising a processor configured to execute a method comprising:
obtaining and outputting at least one of a magnitude of expansion in a first expansion direction having a pulling direction component of a pulling action and a magnitude of contraction in a first contraction direction having a direction component orthogonal to the first expansion direction of an object for causing a pseudo haptic sensation to be perceived by visually presenting a situation in which the object is deformed in accordance with the pulling action by at least one first body part, wherein
the obtaining and outputting at least one of a magnitude of expansion further comprise:
obtaining and outputting both the magnitude of expansion in the first expansion direction and the magnitude of contraction in the first contraction direction.

4. The pseudo haptic sensation control device according to claim 3, the processor further configured to execute a method comprising:
obtaining and outputting at least one of a magnitude of contraction in a second contraction direction having a pushing direction component of a pushing action and a magnitude of expansion in a second expansion direction having a direction component orthogonal to the second contraction direction of an object for causing a pseudo haptic sensation to be perceived by visually presenting a situation in which the object is deformed in accordance with the pushing action by at least one second body part, wherein
a rate of the magnitude of expansion in the first expansion direction to a pulling amount of the pulling action when providing a pseudo haptic sensation of a material having a first stiffness is higher than a rate of the magnitude of expansion in the first expansion direction to a pulling amount of the pulling action when providing a pseudo haptic sensation of a material having a second stiffness which is stiffer than the first stiffness,
a rate of the magnitude of contraction in the first contraction direction to the pulling amount of the pulling action when providing a pseudo haptic sensation of a material having the first stiffness is higher than a rate of the magnitude of contraction in the first contraction direction to the pulling amount of the pulling action when providing a pseudo haptic sensation of a material having the second stiffness,
a rate of the magnitude of contraction in the second contraction direction to a pushing amount of the pushing action when providing a pseudo haptic sensation of a material having the first stiffness is higher than a rate of the magnitude of contraction in the second contraction direction to a pushing amount of the pushing action when providing a pseudo haptic sensation of a material having the second stiffness, and
a rate of the magnitude of expansion in the second expansion direction to the pushing amount of the pushing action when providing a pseudo haptic sensation of a material having the first stiffness is higher than a rate of the magnitude of expansion in the second expansion direction to the pushing amount of the pushing action when providing a pseudo haptic sensation of a material having the second stiffness.

5. The pseudo haptic sensation control device according to claim 3, wherein the object includes an image.

6. The pseudo haptic sensation control device according to claim 4, wherein
the obtaining and outputting at least one of a magnitude of expansion further comprise: obtaining and outputting both the magnitude of expansion in the first expansion direction and the magnitude of contraction in the first contraction direction, and
the obtaining and outputting at least one of a magnitude of contraction comprise obtaining and outputting both the magnitude of contraction in the second contraction direction and the magnitude of expansion in the second expansion direction.

7. The pseudo haptic sensation control device according to claim 6, wherein the object includes an image.

8. The pseudo haptic sensation control device according to claim 3, wherein the object includes an image.

9. A computer implemented method for controlling a pseudo haptic sensation, comprising:
obtaining and outputting at least one of a magnitude of expansion in a first expansion direction having a pulling direction component of a pulling action and a magnitude of contraction in a first contraction direction having a direction component orthogonal to the first expansion direction of an object for causing a pseudo haptic sensation to be perceived by visually presenting a situation in which the object is deformed in accordance with the pulling action by at least one first body, wherein the obtaining and outputting at least one of a magnitude of expansion further comprise:
obtaining and outputting both the magnitude of expansion in the first expansion direction and the magnitude of contraction in the first contraction direction.

10. The computer implemented method according to claim 9, further comprising:
obtaining and outputting at least one of a magnitude of contraction in a second contraction direction having a pushing direction component of a pushing action and a magnitude of expansion in a second expansion direction having a direction component orthogonal to the second contraction direction of the object for causing a pseudo haptic sensation to be perceived by visually presenting a situation in which the object is deformed in accordance with the pushing action by at least one second body part, wherein
a rate of the magnitude of expansion in the first expansion direction to a pulling amount of the pulling action when providing a pseudo haptic sensation of a material having a first stiffness is higher than a rate of the magnitude of expansion in the first expansion direction to a pulling amount of the pulling action when providing a pseudo haptic sensation of a material having a second stiffness which is stiffer than the first stiffness,
a rate of the magnitude of contraction in the first contraction direction to a pulling amount of the pulling action when providing a pseudo haptic sensation of a material having the first stiffness is higher than a rate of the magnitude of contraction in the first contraction direction to a pulling amount of the pulling action when providing a pseudo haptic sensation of a material having the second stiffness,
a rate of the magnitude of contraction in the second contraction direction to a pushing amount of the pushing action when providing a pseudo haptic sensation of a material having the first stiffness is higher than a rate of the magnitude of contraction in the second contraction direction to a pushing amount of the pushing action when providing a pseudo haptic sensation of a material having the second stiffness, and
a rate of the magnitude of expansion in the second expansion direction to a pushing amount of the pushing action when providing a pseudo haptic sensation of a material having the first stiffness is higher than a rate of the magnitude of expansion in the second expansion direction to a pushing amount of the pushing action when providing a pseudo haptic sensation of a material having the second stiffness.

11. The computer implemented method according to claim 10, wherein
the obtaining and outputting at least one of a magnitude of expansion further comprise:
obtaining and outputting both the magnitude of expansion in the first expansion direction and the magnitude of contraction in the first contraction direction, and
the obtaining and outputting at least one of a magnitude of contraction comprise obtaining and outputting both the magnitude of contraction in the second contraction direction and the magnitude of expansion in the second expansion direction.

12. The computer implemented method according to claim 11, wherein the object includes an image.

13. The computer implemented method according to claim 9, wherein the object includes an image.

14. The computer implemented method according to claim 9, wherein the object includes an image.

* * * * *